J. C. WALKINSHAW.
Corn Planter.
No. 60,447.
Patented Dec. 11, 1866.
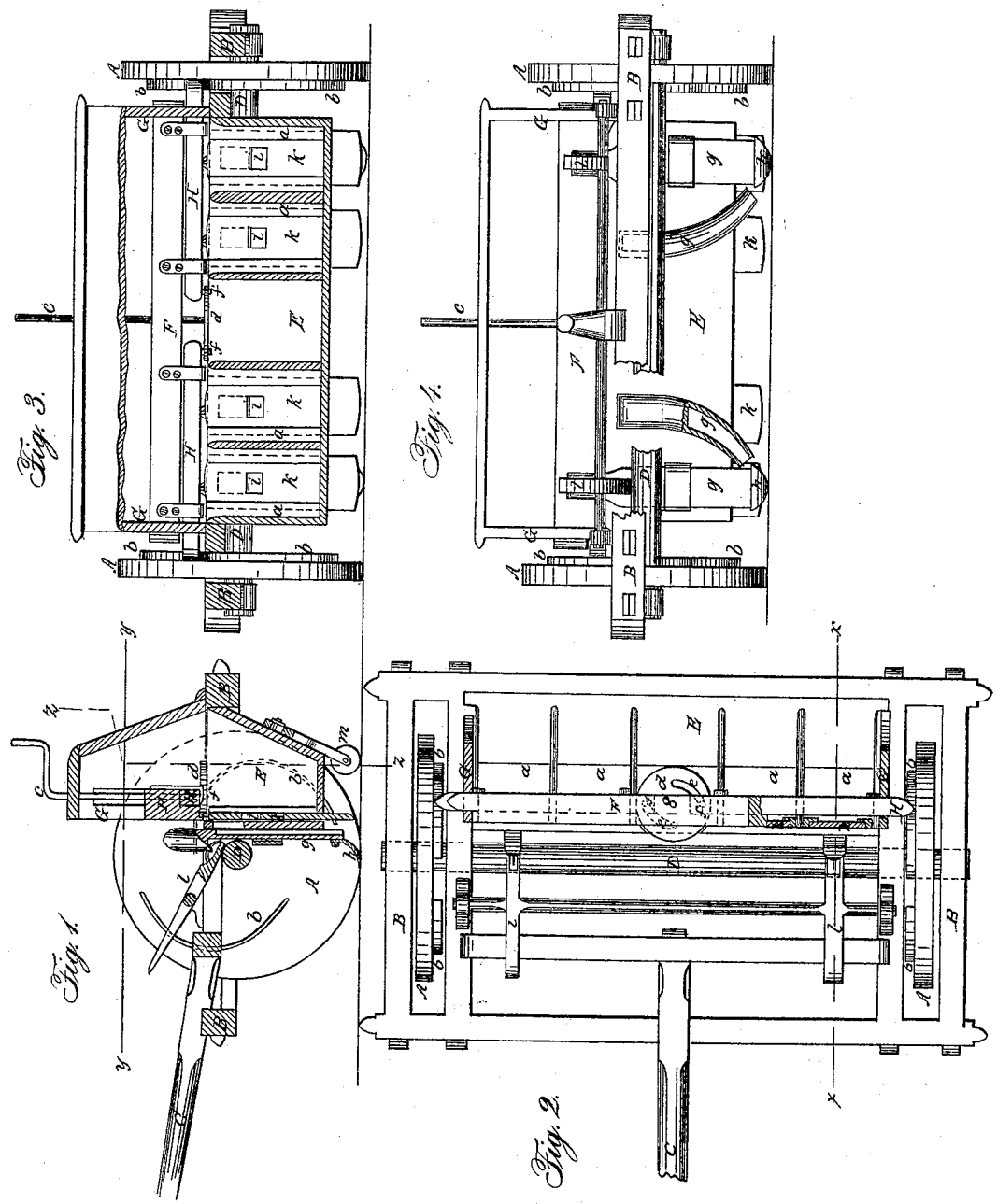
Witnesses:
Inventor:

United States Patent Office.

IMPROVEMENT IN CORN PLANTERS.

J. C. WALKINSHAW, OF LEAVENWORTH, KANSAS, ASSIGNOR TO HIMSELF AND JOS. W. McGONIGLE, OF SAME PLACE.

Letters Patent No. 60,447, dated December 11, 1866.

---

The Schedule referred to in these Letters Patent and making part of the same.

---

TO ALL WHOM IT MAY CONCERN:

Be it known that I, J. C. WALKINSHAW, of Leavenworth, in the county of Leavenworth, and State of Kansas, have invented a new and useful Improvement in Corn Planters; and I do hereby declare that the following is a full, clear, and exact description thereof, which will enable others skilled in the art to make and use the same, reference being had to the accompanying drawings, forming part of this specification, in which—

Figure 1 is a vertical section of the implement taken in the plane of the line $x\ x$, fig. 2.

Figure 2 is an internal plan view with the upper part removed in the line $y\ y$, fig. 1.

Figure 3 is a rear sectional view with the back part removed in the line $z\ z$, fig. 1.

Figure 4, a front view.

Similar letters of reference indicate like parts.

This invention relates to improvements in the construction of an implement for planting corn, and consists of devices for dropping the corn evenly in hills at regular distances apart, in connection with an arrangement for dropping at the same time, either a small quantity of guano or other similar fertilizing material, or planting beans with the corn.

A A, are two driving wheels upon which is mounted a box, truck, or carriage frame B B, to which is attached the draft pole C, for a double team. Between the wheels and just behind the axle D, and parallel with it is placed a long box or trough E, divided into compartments or seed bins, $a\ a$, two in each side of the middle of the box. Above the box E, over the front side, is a horizontal dropping bar F, which works up and down in an upright frame G, that is mounted upon the truck frame B B. On the under side of the dropping bar F, are two horizontal slide bars H H, for throwing the dropping bar F, in and out of gear, and working the planting apparatus when it is in gear. For this purpose two or more cams or eccentric curved bars $b\ b$, are placed on the inside face of each driving wheel, so that when the slide bars H H, are moved outward their ends catch against the cams $b\ b$, which lift them and also the dropping bar F, as the driving wheels revolve. The slide bars H H, are shifted in and out at pleasure by the driver on the top of the machine by means of a vertical crank-rod $c$, that turns a circular plate $d$, containing two eccentric slots $e\ e$, in which work the pins $f\ f$, on the inner ends of the slide bars H H, to move them back and forth or in and out of gear as the plate $d$, is turned by the crank $c$. On the front side of the box E, and opening into the seed compartments $a\ a$, are dropping spouts or seed conductors $g\ g'$, the outer ones $g\ g$, leading straight down behind the shovel plows $h\ h$, which are attached to each side of the implement for opening the furrow to receive the corn; and the inner spouts $g'\ g'$ curving downward to the same point behind the plows. On the inside of the compartments $a\ a$, are vertical slides $k\ k$, which lie up against the front and are connected with the dropping bar F, so that they rise and fall with it as it is moved up and down by the action of the cams $b\ b$, on the bars H H, when in gear and the driving wheels move forward. In the slides $k\ k$, are openings $i\ i$, communicating with the conductors $g\ g'$. The plows $h\ h$, are raised or lowered as desired for clearing the ground or working, by means of a lever frame $l\ l$, on the front part. Rollers $m\ m$, fig. 1, are hung to the box E, behind the plows to cover and compress the corn in the furrow. When the corn planter is in the field ready to work, the cams $b\ b$, operate on the bars H H, and raise the cross beam F, which draws up the slides $k\ k$, in the seed compartments $a\ a$, allowing a specific quantity or certain number of grains of corn to pass through the openings $i\ i$, into two of the conductors every time the slides lift, and thus drop into the furrow behind the plow at regular intervals, and at the same time a certain quantity of guano or a certain number of beans pass through the other two slides and enter into the other two conductors to be dropped with the corn.

Having thus described the construction and operation of my invention, what I claim as new, and desire to secure by Letters Patent, is—

1. The arrangement of the cams $b\ b$, on the driving wheels A A, in combination with the dropping bar F, the vertical slides $k\ k$, the seed compartments $a\ a$, and the conductors $g\ g'$, constructed and operating substantially as and for the purposes herein described.

2. The lever frame $l\ l$, connected with the plows $h\ h$, for raising and lowering them, constructed and arranged substantially as shown and described herein.

J. C. WALKINSHAW.

Witnesses:
RICHARD R. REES,
R. C. FOSTER,
A. CASPER.